United States Patent
Pellegrino et al.

(10) Patent No.: US 6,614,204 B2
(45) Date of Patent: Sep. 2, 2003

(54) CHARGING STATION FOR HYBRID POWERED VEHICLES

(76) Inventors: Nicholas J. Pellegrino, 161 Spencer Ave., Lynbrook, NY (US) 11563; Ed Farrell, 1830 Bellmore Ave., Unit 7, Bellmore, NY (US) 11710

( * ) Notice: Subject to any disclaimer, the term of this patent is extended or adjusted under 35 U.S.C. 154(b) by 0 days.

(21) Appl. No.: 10/027,897

(22) Filed: Dec. 21, 2001

(65) Prior Publication Data

US 2003/0120442 A1 Jun. 26, 2003

(51) Int. Cl.$^7$ .............................................. H01M 10/46
(52) U.S. Cl. ...................................................... 320/109
(58) Field of Search ................................ 320/108, 109, 320/104

(56) References Cited

U.S. PATENT DOCUMENTS

| | | | |
|---|---|---|---|
| 4,158,802 A | 6/1979 | Rose, II | |
| 4,532,418 A | 7/1985 | Meese et al. | |
| 4,555,618 A | 11/1985 | Riskin | |
| 4,861,971 A | 8/1989 | Chan | |
| 5,166,680 A | 11/1992 | Ganot | |
| 5,184,058 A | 2/1993 | Hesse et al. | |
| 5,548,200 A | 8/1996 | Nor et al. | |
| 5,563,491 A | 10/1996 | Tseng | |
| 5,594,318 A | 1/1997 | Nor et al. | |
| 5,619,417 A | * 4/1997 | Kendall | |
| 5,648,906 A | 7/1997 | Amirpanahi | |
| 5,742,229 A | 4/1998 | Smith | |
| 6,081,205 A | 6/2000 | Williams | |
| 6,252,524 B1 | 6/2001 | Takikita | |

* cited by examiner

Primary Examiner—Edward H. Tso
(74) Attorney, Agent, or Firm—Bryan Cave LLP (57) ABSTRACT

A charging station for a hybrid energy vehicle includes a housing, a controlled access power receptacle coupled to the housing, the power receptacle having a connector coupled to a power source, the connector for receiving a connection to supply an electrical charge to a vehicle, logic circuitry contained within the housing coupled to the power receptacle for controlling access by a user to one of the connector and the power receptacle, and an optical reader coupled to the logic circuitry for reading data associated with the vehicle from a data source remote from the optical scanner unit, where said data source is in optical communication with the scanner unit, the scanner unit communicating said data to the logic circuitry. A method of charging a vehicle includes the steps of providing a machine readable coded element associated with a vehicle, locating the vehicle sufficiently proximate to a charging station having an optical reader unit to allow the vehicle to be connected thereto, connecting the vehicle to the charging station, and displaying the coded element to the charging station optical reader unit so as to initiate flow of power from a power supply to charge the vehicle. Additionally, a method of charging a vehicle includes reading machine readable data associated with a vehicle, communicating the machine readable data to a central processing location, processing the machine readable to receive an approval signal or a disapproval signal, in response to receiving an approval signal of the data, instructing the charging station to open a power receptacle for receiving a connector allowing an electrical power connection between a power source and the vehicle, and charging the vehicle.

24 Claims, 5 Drawing Sheets

CHARGING STATION FOR HYBRID POWERED VEHICLES

FIELD OF INVENTION

The invention relates to charging stations for hybrid vehicles.

BACKGROUND OF THE INVENTION

Vehicles powered by hybrid sources of energy are becoming increasingly common. In particular, technology for electric powered vehicles now enable such vehicles to reach speeds and enjoy ranges of operation very closely approaching, if not exceeding, those enjoyed by vehicles powered through traditional fossil fuels or internal combustion sources. However, now as before, major challenges to a large scale adoption of electrical vehicles include problems of access to charging stations and the necessary time spent charging the vehicle. Charging systems at the owner's business or residence where the vehicle may be stored are one solution. This, however, drastically curtails the effective range of the vehicle as compared with internal combustion engines given the lack of fuel distribution systems in place to supply the on-road fuel needs of these power sources. A driver of a gas powered vehicle need not return home for fuel, gas stations are widely available and well dispersed to allow for constant fuel replenishment and, hence, greater ranges of travel. The same must be true for electrically operated vehicles if these vehicles are to live up to their potential of being a viable alternative to fossil fuel powered vehicles.

Tapping an electrical power source to charge and then operate a vehicle closely comparable in size and performance to a fossil fuel powered vehicle takes time. The vehicle must stay in one location and connected to a power source for a period sufficient to charge the vehicle. Thus, a charging station equipped as a gas station would not be efficient, as the quick turnover necessary for profitable operation of gas stations would be difficult to achieve if a vehicle must sit for extending periods during charging. Charging efficiency would be enhanced, without compromising the operational range of the vehicle, if charging could take place during periods where the vehicle is idle, yet distant from its home or base, for instance where it is parked while its operator works, shops or attends to various engagements. Thus, having access to a charging station during a period of anticipated vehicle inactivity would greatly increase range and convenience of use and eliminate reliance on other impractical though self reliant solutions, such as carrying new or newly charged batteries for replacement.

Quick payment for charging and efficient operation of charging stations are also desirable. Integrating payment systems for such fees as parking fees and electric charging fees into one source is one possible solution. Money slots and credit card swipes are, however, not the fastest and efficient means of paying both charges and parking fees. Money may require change to be dispensed and may require additional input of cash if the original amount inserted proves insufficient. Credit or debit card swipes often involve a lengthy authorization for the charges incurred, and may also require the user to remember and/or enter a pin numbers or other identification means. Also, credit and debit cards may need be tied to numerous different bank computers or other payment sources separate from those receiving charging revenue (which may be a town or municipality). Integrating these payment sources, may therefore prove difficult.

What is needed is a fast, efficient recordation and payment means to accompany the charging station and enable an electric supply infrastructure to develop.

SUMMARY OF THE INVENTION

An apparatus capable of connecting a vehicle to an external power source is disclosed, said external power source having a power receptacle being electrically coupled to the external power source, said apparatus comprising connection means for removeably connecting said power source to said vehicle, logic circuitry coupled to said connection means for selectively controlling access by a user to the power source, and an optical reader coupled to the logic circuitry for reading data associated with the vehicle from a remote data source, said remote data source being in optical communication with the scanner unit, the scanner unit communicating said data to the logic circuitry for controlling charging of said vehicle based on said data.

Further disclosed is a method of charging a vehicle comprising the steps of providing a machine readable coded element associated with a vehicle, locating the vehicle sufficiently proximate to a charging station having an optical reader unit to allow the vehicle to be connected thereto, connecting the vehicle to the charging station, and displaying the coded element to the charging station optical reader unit so as to initiate flow of power from a power supply to charge the vehicle.

A further method is disclosed comprising the steps of reading machine readable data from a data source associated with a vehicle, communicating the data to a central processing location, processing the machine readable data to receive an approval signal or a disapproval signal, and in response to receiving an approval signal of the data, initiating a flow of power to the vehicle to charge the vehicle.

Other features and advantages of the present invention will be apparent to one skilled in the art from the following detailed description and drawings. As used herein, "in communication with" and "coupled" include direct and indirect (i.e., through an intermediate) communication and coupling. As also used herein "vehicle" is limited not only to automobiles, but may also encompass other powered transportation vehicles, such as boats, airplanes, motorcycles, scooters, trucks, trains and other motorized forms of locomotion.

DETAILED DESCRIPTION OF THE INVENTION

Figure 1:
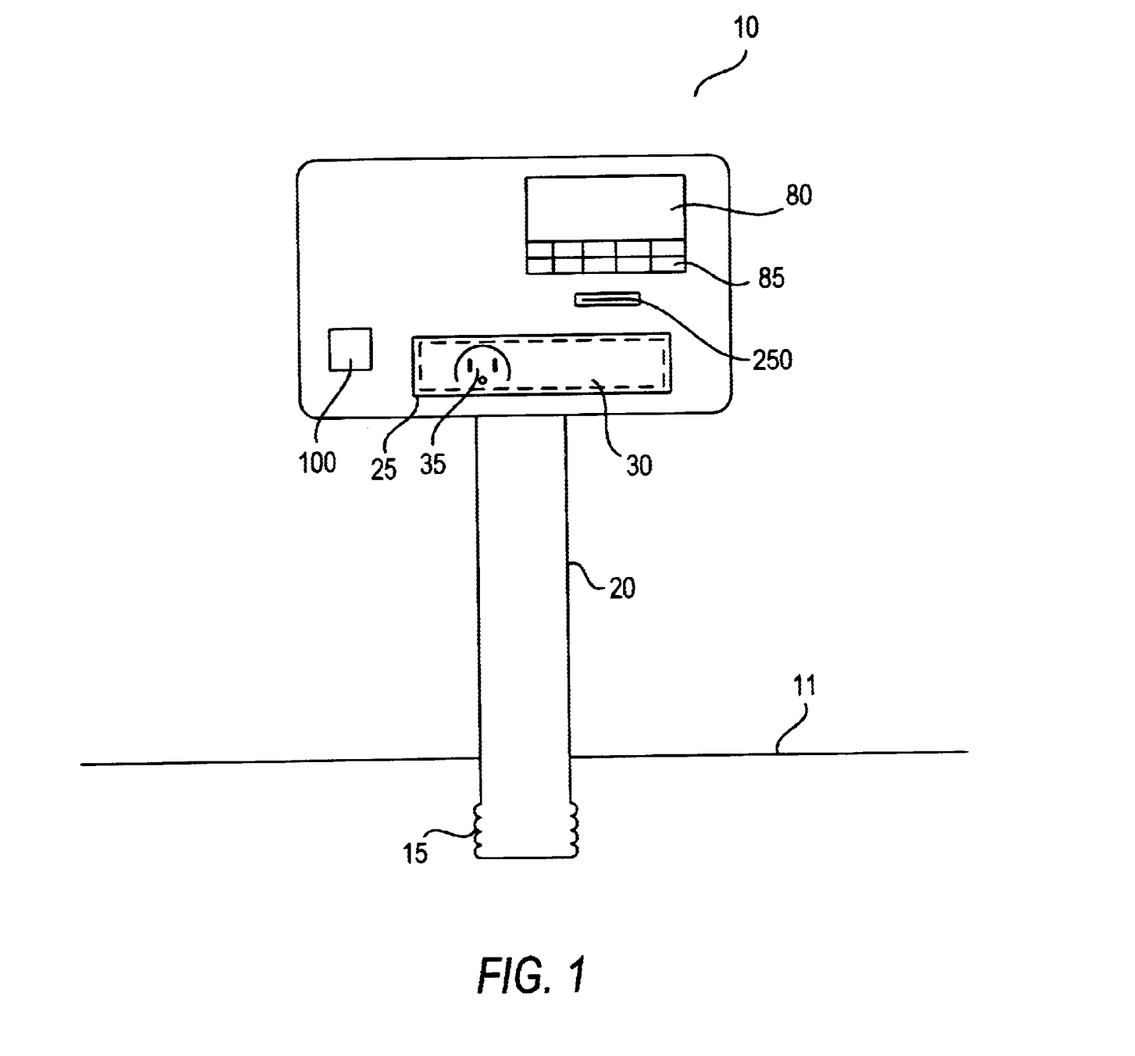
FIG. 1 illustrates a frontal view of the charging station of one embodiment of the invention.
Figure 2:
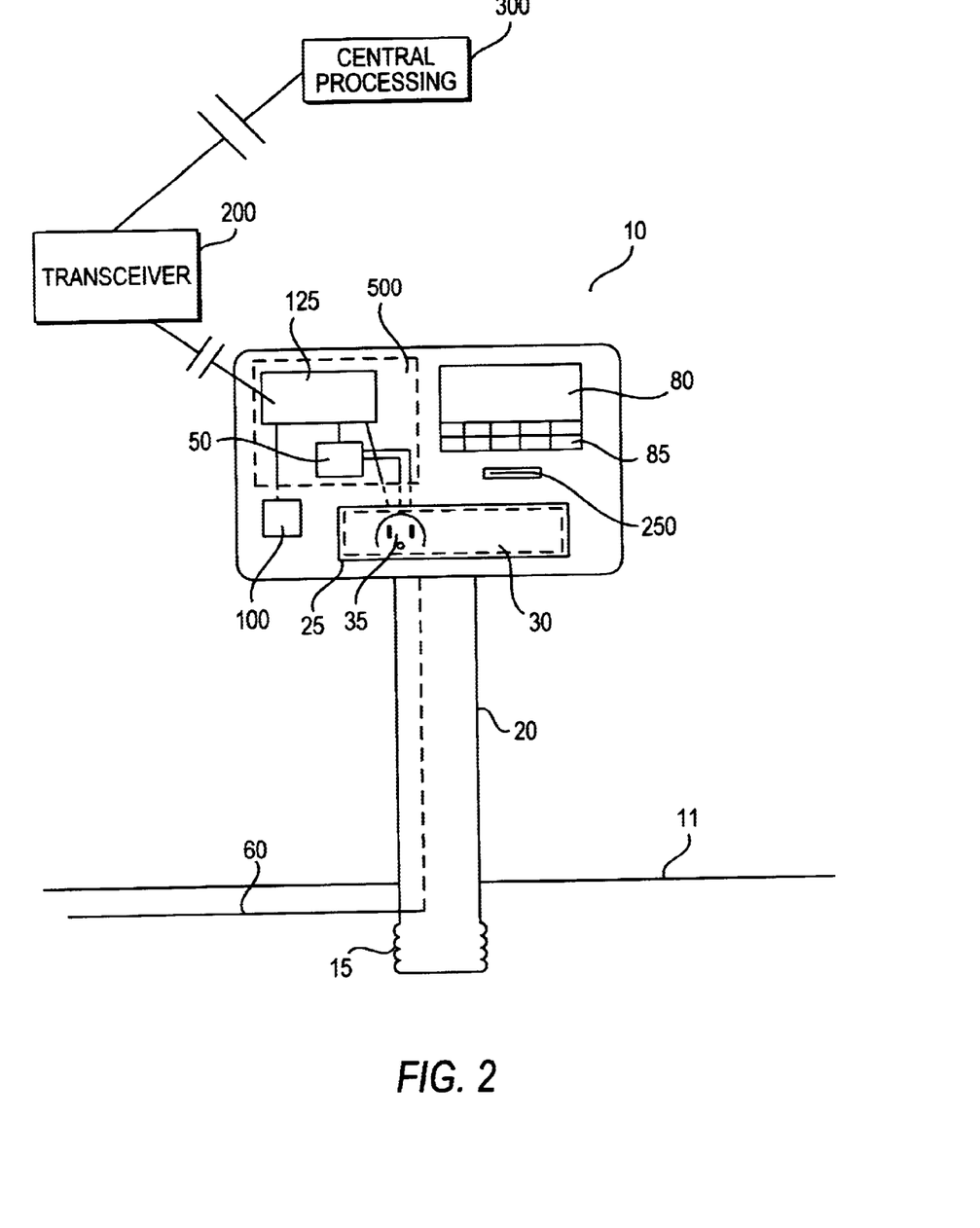
FIG. 2 illustrates the frontal view of FIG. 1 with an integral schematic block diagram cutaway, of the charging station.

The invention will be described in detail with respect to the drawings. FIG. 1 illustrates a charging station 10 of one embodiment of the invention. FIG. 2 illustrates a charging station 10 of the same embodiment of the invention, and includes a cutout portion 500 illustrating a schematic block diagram of devices internal to the charging station. It is to be appreciated that the relative size and location of each element depicted in FIGS. 1 and 2 are depicted in simplified form for ease of description, and that the devices depicted may be varied in size or location according to design considerations without deviating from the invention.

With respect to FIG. 1, the charging station 10 may be combined with a parking meter or other metering device measuring time that a vehicle occupies a particular location. Alternatively, there may be no other metering device combined with the charging station 10. Charging station 10 may be fixed in a suitable manner so as to be proximate to a pre-determined location such as a municipal parking space (not pictured) where a vehicle to be charged may be parked for the time necessary to complete a charging operation. In the preferred embodiment, charging station 10 is coupled to a post 20 which is fixed to or within a concrete surface 11, for instance by placing the post within a bored space, said space and/or post 20 may be threaded 15 and the post screwed into its bore to ease installation and increase strength.

In the embodiment of FIG. 1, charging station 10 includes a power receptacle 25 with a locking mechanism 30 preventing access to power receptacle 25 when not in use to charge a vehicle. Power receptacle 25 is a predetermined location where a connection means supplying the vehicle with power for charging is coupled to a power source. In the preferred embodiment, power receptacle is a controlled access power receptacle having locking mechanism 30. Other means for controlling access to the power source, such as a switching mechanism or power controller is within the scope and contemplation of the invention. As will be further described herein, access to the power source is determined by data received at one or more of optical reader 100, card reader 250 and/or keyboard 85. Display 80 provides an interface with the user for regulating input and receiving output of information and data.

In the preferred embodiment, the locking mechanism 30 may be a door, flap or other suitable device selectively covering at least a portion of the power receptacle 25 wherein locking mechanism has an automatically operable lock. In the embodiment of FIG. 1, the power receptacle 25 is a pre-determined area providing the interface with an outlet coupled to a power source, as well as other devices internal to the charging station 10, and thus may include one or more sockets 35 configured to receive plugs (not pictured) as the outlet coupled to a power supply, for instance a line to a municipal power source, allowing a plug for a power line (not pictured), such as a cable or cord, to be inserted to connect the vehicle to the power source to receive the necessary current and voltage for charging. The socket may be of any suitable type for such connection, not limited to the three prong version illustrated in FIG. 1. A power line, which may be any suitable conductive line for charging an electric vehicular battery having a suitable plug or contact to engage the socket 35, may connect to the vehicle so as to electrically communicate with the battery or other input to a suitable vehicular power source.

In an alternative embodiment, power receptacle 25 may include a plurality of sockets (not pictured) wherein each socket is configured to receive a plug to access a particular pre-determined voltage or current level. Circuitry within charging station 10 may be provided to inductively or resistively program the electrical signal in the power line to emit a preferred voltage or current to a particular plug. Alternatively, a single plug may provide the only outlet, coupled to programming circuitry (not pictured) that programs the signal on the power-line, for instance using inductive or resistive programming, to provide a preferred current or voltage in response to information received by said circuitry regarding the particular vehicle to be charged.

Alternatively, power receptacle 25 may utilize a plug, instead of a socket. Also, other configurations of the power receptacle may include other connection means known in the art to, for instance, an intrinsic cable with connector affixed or removeably coupled to the power receptacle or otherwise to the charging station, to connect a vehicle to a power source. In an alternative embodiment, the power receptacle may not have a controlled access door, flap or other mechanical block, but rather the power flow is controlled by a power controller, such as that previously described, or other suitable power controller.

With respect to the cutaway illustration of charging station 10 in FIG. 2, power source 60 may supply electrical power, e.g., voltage and current, to sockets 35 through a power controller 50. Power controller 50 may include a switch or switches for interrupting or otherwise controlling the flow of power to socket 35, or other outlet or connection means, and may also include an AC/DC converter to modulate and convert voltage received from power source 60. Suitable switches and AC/DC converters are known in the art. An AC/DC converter may not be converted or a bypass switch may be incorporated into power controller 50 to bypass AC/DC converter where conversion of the power signal is unnecessary, for instance, where the vehicle to be charged includes an AC/DC converter. Power source 60 may comprise a connection to a commercial power supply (not pictured) for instance, leading through post 20 to a municipal power line (not pictured). During use of this embodiment to charge a vehicle, a plug or connector coupled to a power line from an electric vehicle is received within socket 35 and thus connected to power supply 60. The flow of current and voltage from the power supply 60 to the vehicle battery or power source sufficient to charge the vehicle then commences. Logic circuitry, which may include a processor 125, regulates operation of the charging station including switches and other devices in power controller 50, and allows communication and control between the various devices in charging station 10 as well as between charging station 10 and remote sources, such as transceiver 200 and central processing unit 300.

Display 80, which may be included with keyboard 85 for user input, communicates with processor 125 regulating the operation of power receptacle 25 and the flow of voltage and current as well as operation of locking mechanism 30 in response to instructions received from user input, through either display 80, keyboard 85 or through optical reader 100, or from a remote central processing unit 300, though transceiver 200. Thus, logic circuitry controlled by processor 125 collects, stores and sends data to the display to give a read out to the user of various information, for instance charge, time and cost, as well as other information which may be received at the processor 125 from remote locations such as central processing unit 300. Display 80 may comprise a digital display providing a liquid crystal read-out of data received from the processor 125, along with instructions or other information regarding use and status of the charging station 10. On-screen touch options for user input on display 80, either in addition or instead of keyboard 85, is also within the scope of the invention.

Optical reader 100 is used to record payment, vehicle and user identification information, for instance, user account information, displayed by the user on, for instance, a decal applied to the vehicle or on a card displayed before optical reader 100. Optical reader 100 has the ability to read and/or scan encoded data, for instance infrared scanning of a data source in a bar code form. Suitable optical readers 100 may have a scanning system (not pictured) including a light source, such as a laser, for providing a light beam; an optical system for scanning the light beam in a predetermined pattern throughout a defined scanning region. In addition, the scanning system includes a detection system for detecting light having at least a pre-determined intensity reflected from the bar code symbol and for providing an electrical signal in response to detection of such reflected light. Moreover, an optical system is included for: directing light from the scanned light beam that is reflected from the bar code symbol to the detection system. Optical reader 100 may also use one-dimensional and two-dimensional multi-photosensor array charge-coupled devices (CCDs). The multi-photosensor array CCDs image an entire bar code symbol, and the resultant electronic image is then processed using pattern recognition techniques known in the art to decode the bar code symbol.

A suitable barcode scanning system, for instance, includes two parts; the barcode reader, mounted on charging station 10 proximate to and facing the location where the vehicle would be parked during charging, and the barcode labels which are applied to vehicles or ID cards. Barcode readers that can read a barcode label at least a 6 foot distance in direct sunlight are known. A hood or other shading device may be affixed to the outside of optical reader 100 to assist in the direction finding and focusing the scanning light on a vehicle parked at a suitable distance, for instance within the parameters of a well marked parking space with which charging station 10 would be associated. Suitable data output in the scanning system, e.g., about 26 bit, provides the capacity for the optical reader 100 to communicate with processor 125 or other devices and modules associated with charging station 10.

The barcode labels may be of a size sufficient to be scanned according to available bar code scanning systems, typically between 1" to 6" in length and about ¼" to 1½" wide, printed on resilient retro-reflective material known in the art. This material may be similar to material used to make letters and graphics for street signs and other outdoor uses. Different types of adhesives may be used so that labels can be removed easily or applied to a vehicle repeatedly. Although the "standard" barcode is made up of black stripes on a white background, other contrasting colors may also be used. Barcode labels may be applied directly to the vehicle. The usual place for the label is on a side window near the front and/or rear of the car, e.g., that portion of the vehicle passenger compartment closest to the charging station 10 when parked suitably.

In addition to barcode systems, transmitters and prox cards, may also be used to identify the vehicle and/or user and provide payment. Prox cards are miniature radio tags that are attached to the vehicle. As the vehicle approaches the charging station, a radio signal interrogates the prox card, asking for the access ID and other vehicle information that may be encoded thereon. The card transmits back the ID code, which identifies the vehicle, its user and payment source. Range for these systems vary between 3 feet and 20 feet.

The encoded data included on a barcode decal, prox card, or other suitable machine readable source, when displayed at a location remote from Reader 100 and at a pre-determined distance sufficient to detect a data source visibly mounted on a vehicle, yet sufficiently limited in optical range to prevent inadvertent readings of distant or passing vehicles, is read by Reader 100 and the data is communicated to processor 125, which may be a microcomputer or microprocessor, or other suitable digital or logic circuit, or may be a plurality of interrelated or interconnected microcomputers, microprocessors or other suitable logic or digital circuitry, for instance located on a integrated circuit or on circuitry affixed or coupled (e.g. through removable computer cards) to a mother board or circuitry panel. Processor 125 receives the data and, subject to a programmed set of instructions and directions stored (for instance within processor 125 memory) and/or accessible to processor 125, or received from a remote source, may then regulate the system to do one or more of the following: 1) unlock or otherwise enable user access to power receptacle 25 and/or socket 35, 2) communicate with a transceiver 200, which relays user information contained in the bar code or other encoded material to a central processing location 300, such as with a municipality, so that account, user or vehicular information may be accessed based on the information, compared and processed, 3) regulate, through, for instance, the power controller 50, the current and voltage in response to a particular data source or other coded information, such as battery or vehicle type received as data from either the encoded material or received from collated account information accessed by and sent from a remote source, 4) meter or otherwise keep track of parking time, charging time and cost, which may be communicated to the display 80, 5) receive information sent to it from the central processing location 300, indicating status and availability of charging, price for charging, account status and information, or other information a centralized processing authority may from time to time communicate.

Alternatively, a compact swipe card reader 250 may also be provided instead of or in addition to optical reader 100 for access by a user. Card reader 250 also communicates information from an encoded card source, which may be a credit card or other specially issued card for access to charging services, with processor 125. The processor 125 then communicates with transceiver 200 and central processing location 300 as with the reader 100.

Figure 3:
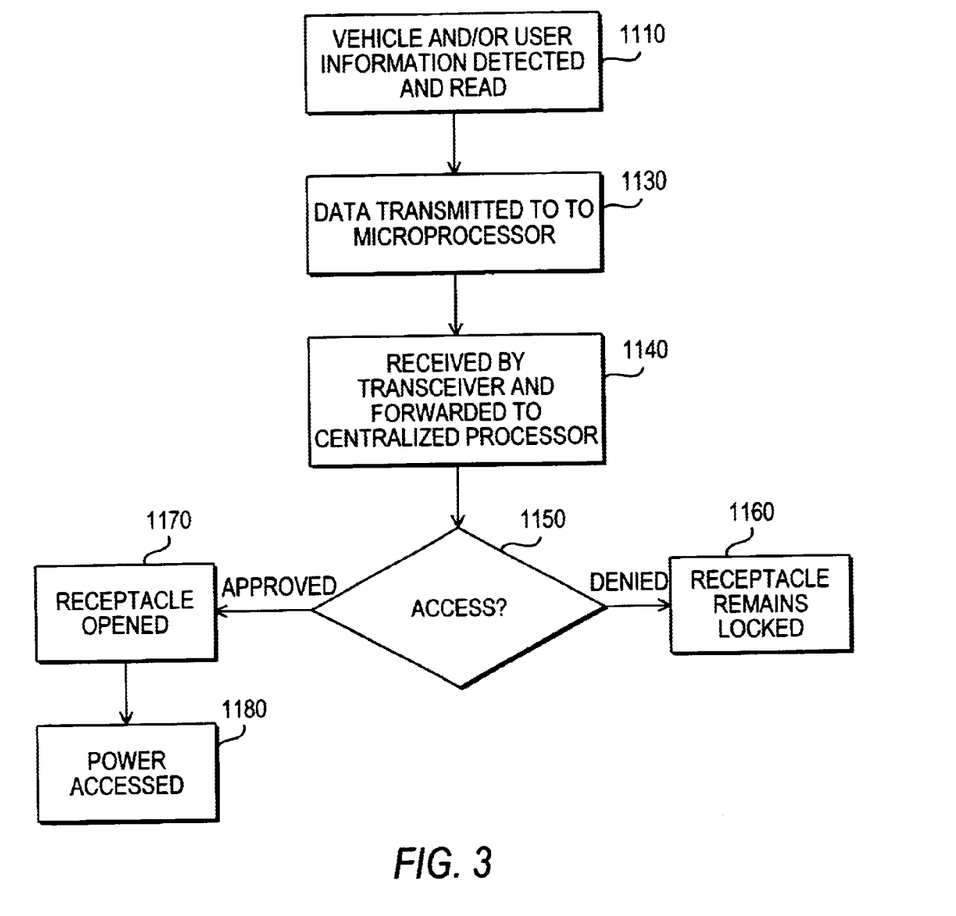
FIG. 3 illustrates a flow chart diagram of the method of one embodiment of the invention.

FIG. 3 illustrates a flow chart illustrating the operation and use of charging station 10 and its components and accessories according to one embodiment of the invention. The method illustrated involves reading machine readable data associated with a vehicle, communicating the machine readable data to a central processing location, processing the machine readable data to receive an approval signal or a disapproval signal, in response to receiving an approval signal of the data, instructing the charging station to open a power receptacle for receiving a connector allowing an electrical power connection between a power source and the vehicle, and charging the vehicle.

Figure 4:
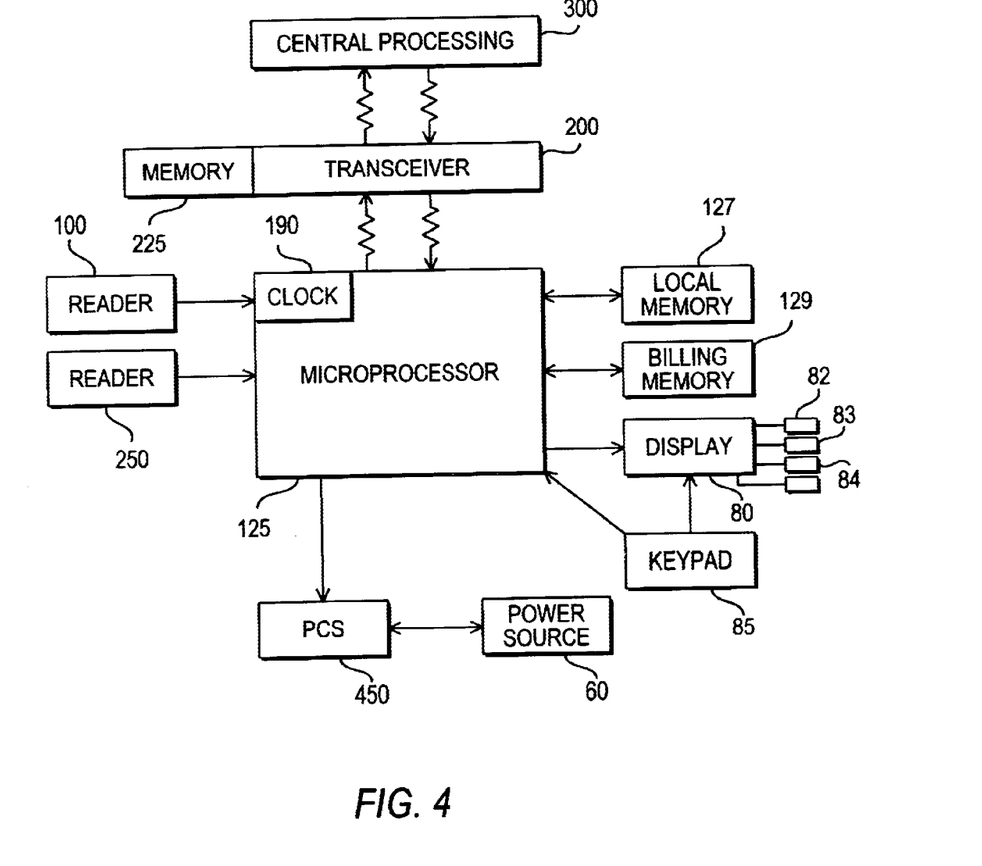
FIG. 4 illustrates a schematic block diagram of functional components of one embodiment of the invention.

With respect to FIG. 4, at functional block 1110 encoded information pertaining to a vehicle or user is detected by the reader 100 on charging station 10 circuitry, this could also be detected by card reader 250 and may involve display of the encoded information proximate to optical reader sufficient for optical reader to scan and derive encoded information therefrom. For instance, the encoded information may be a bar code on a decal applied to the visor or windshield of a car parked in front of the charging station yet sufficiently close to be detected by the optical reader. The encoded information is transmitted as data to processor 125 for processing 1130. The processor 125 processes the data according to pre-determined thresholds contained in its associated memory and sends the data to transceiver 200 where they may be temporarily stored and/or then are forwarded to a centralized processor 300. The centralized processor 300 receives the information at functional block 1140 and the data encoded information is identified, reviewed, and compared against previously stored data files to verify the user or vehicle, their account and the account status, as well as other identifying information which may be stored centrally. At decision block 1150 the user or vehicle is either verified and approved, i.e., authorized to proceed with charging or parking, with sufficient funds allocated in an account kept by the user or for the vehicle for the operation selected, or the user or vehicle is not verified and denied access, or if verified, is denied access to charging due to either a block on the account for insufficient funds, an outstanding stolen property report in the database or other reason. The decision made at the central processing location is then communicated back to processor 125 and received. If access is denied, the power receptacle remains locked 1160. If the account is approved, 1170 the processor 125 activates locking mechanism 30 to open, exposing receptacle 25 to allow socket 35 and hence the power source 60 to be accessed, or parking time and options are displayed on the display 60. Alternatively, upon approval of access, the processor 125 may activate power controller 50 to allow power to flow from power source 60. Similarly, if power receptacle is opened the user may then select various charging options (which may be circumscribed depending on the account status and amount remaining.). Using the card reader, alternatively a credit card may be used to supplement an account with insufficient or diminishing funds. The user may then connect the vehicle to the power receptacle socket 1180, or otherwise connect the vehicle to the power source as indicated with respect to FIGS. 1 and 4, and other embodiments discussed herein.

From the user perspective, charging the vehicle involves providing a machine readable coded element associated with a vehicle, for instance a bar code strip or other machine readable data source, locating the vehicle sufficiently proximate to a charging station having an optical reader unit to allow the vehicle to be connected thereto, connecting the vehicle to the charging station, and displaying the coded element to the charging station optical reader unit so as to initiate flow of power from a power supply to charge the vehicle.

FIG. 4 illustrates a systemic block diagram illustrating the electrical components and logic circuitry of charging station 10. Processor 125 may be a microcomputer, microprocessor, or series of microcomputer chips of conventional design. Processor 125 and its connections to the various devices and elements, either remote from or present within charging station 10, provides logic circuitry that coordinates operation of the various systems incorporated into charging station 10. Processor 125 utilizes a memory capacity, for instance, a local memory 127 and billing memory 129, in its operation to temporarily store information pertaining to the vehicle charging operation. Such memory can be RAM or ROM types depending on the desired operations processor 125 will perform and regulate locally and the degree of local memory to be allotted to its operation. Processor 125 receives data from card reader 250 and/or optical reader 100 to derive data associated with a vehicle. Information received, prompts and other input may be displayed by processor 125 to LCD Display 80 for user interaction, which may be accomplished through keypad 85. Information that may be displayed may include charge time 82, time for parking in excess of time required to charge 83, billing charges 84 and/or status or mode of the display 81. Internal timer 190 may be a computerized clock or other suitable timing mechanism coupled to processor 125 regulating its temporal operation and also, optionally, coordinating receipt and processing of data by processor 125 if multiple inputs from remote sources require processing, for instance, information or data received from or via remote transceiver 200. Transceiver 200 may include a memory element 225, which may be RAM or ROM, to temporarily store data received from charging station 10 or multiple charging stations that may be coupled to transceiver 200. Transceiver 200 is in communication with central processing location 300 where centralized billing is conducted. Communication between charging station processor 125, transceiver 200 and/or central processing location 300 may be through a telephone line, radio communication or other suitable remote communication means.

Processor 125, as may be instructed by central processing location 300, through transceiver 200, operates power control system (PCS) 450 which system may be switching circuitry in power controller 50 to initiate or curtail flow of power to charge the vehicle from commercial power source 60 which is accessed by charging station 10, may be control over the locking mechanism 30 regulating access to power receptacle 25 and socket 35, or both.

Figure 5:
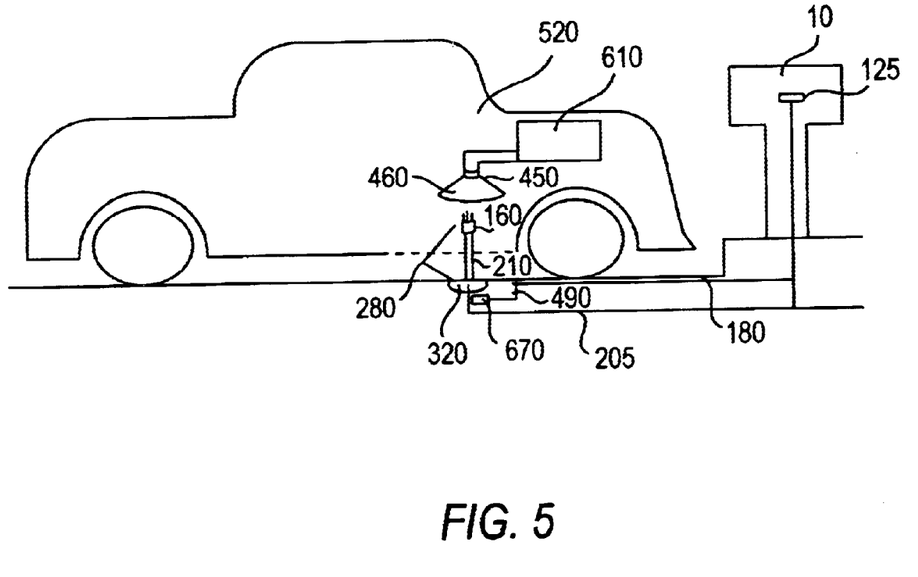
FIG. 5 illustrates a charging station featuring a power source connection of an alternative embodiment of the invention.

FIG. 5 illustrates an alternative embodiment of the invention. In this embodiment, charging station 10 is remotely integrated with a parking space 180 wherein the power receptacle is remote from the housing and is a power connector 280 located on the parking space surface 180. The power connector 280 of this embodiment may be a male plug 160 coupled through, for instance, a cable 210, to a power source 205, which may be a power line or other link to a source of electrical charging power. The cable 210 or other coupling terminating in the male plug 160 may be extendible, and circumferentially wrapped by a flexible covering providing a rigidity sufficient to extendably project from surface housing 320, and may be telescoped to fit within surface housing 320. In the preferred embodiment pictured, surface housing 320 is situated in a pre-determined position in a parking space that is associated with the charging station 10 by, for instance, proximity or by a numerical or other assignment where the charging station is remote from the parking space. Parking space surface includes surface housing 320, with cable 210 with plug 160 that is upwardly extendible from the parking space surface toward the underside of vehicle 520. A socket 450, or other suitable connector, on the underside of vehicle 520 may receive plug 210, raised on cable 210, in this embodiment. A guide 460 may be mounted circumferentially about socket 450 in this embodiment, for instance in a conical shape, to direct an upwardly extending plug 160 and flexible semi-rigid cable 210 to the correct position for engaging socket 450, for instance, by allowing a certain degree of deformation to the semi-rigid cable to adjust direction. Returning cable 210 and plug 160 to the housing may require a slot defined by rigid edges that straighten cable 210 and plug 160 to a pre-determined upright position for the next user. Motor and drive train 490 operable through a signal generated by processor 125 at charging station 10 may operate the upward and downward engaging motion of cable 210 and intrinsic plug 160. Similarly, processor 125 may also communicate with a power control device 670, similar in structure and operation to power controller 50 in FIG. 1, to initiate the flow of power, e.g. voltage and current, to charge the vehicle battery 610, coupled with socket 450. The relative positions of devices pictured in FIG. 4 are only one configuration, other suitable configurations and locations for devices would occur to one of skill in the art. Likewise, similar operation of an extendible cable and plug operated from other locations within a parking space, for instance horizontally from a wall, or vertically from a location above the vehicle would also occur to one of ordinary skill in the art and are thus within the scope and contemplation of the invention.

In an alternative embodiment, a plug installed in the surface of the parking location may be accessible by a specially constructed lead, for instance using a plunger mechanism to force the lead down into the socket after the vehicle is parked in a pre-determined location, which may be assisted by markings on the pavement. A power line leads to the charging station and the flow of current is controlled by sensors communicating with the processor. Once access is allowed, the sensors may allow power to flow through the connection to the vehicle line. The sensors may also be configured so as to detect a circuit connection to the vehicle power source, for instance by detecting a certain level of inductive resistance within the vehicle power source, and only upon detection of a completed circuit would the power be provided. It is to be appreciated that the socket for the power receptacle for this embodiment may be located at any suitable location under, around or proximate to the vehicle, preferably under the vehicle to hinder tampering with the charging operation that may otherwise affect a cable or cord above ground and in full view extending between the vehicle and the charging station, which may be disconnected for instance, by other cars, bicyclists, children, vandals, inattentive pedestrians or other potentially disruptive agents which may disconnect a plug connection maintained with a charging station using a cord attached from the car up to a power receptacle situated on a post.

While the invention has been illustrated and described with respect to specific illustrative embodiments and modes of practice, it will be apparent to those skilled in the art that various modifications and improvements may be made without departing from the scope and spirit of the invention. Accordingly, the invention is not to be limited by the illustrative embodiment and modes of practice.

We claim:

1. An apparatus capable of connecting a vehicle to an external power source, said external power source having a power receptacle being electrically coupled to the external power source, said apparatus comprising:
   connection means for removably connecting said power source to said vehicle;
   logic circuitry coupled to said connection means for selectively controlling access by a user to the power source; and
   an optical reader coupled to the logic circuitry for reading data associated with the vehicle from a remote data source, said remote data source being in optical communication with the optical reader, the optical reader communicating said data to the logic circuitry for controlling charging of said vehicle based on said data.

2. The apparatus of claim 1 further comprising:
   a central processor unit; and
   a transceiver in communication with the logic circuitry for relaying data received by the logic circuitry to said central processor unit.

3. The apparatus of claim 1 wherein the data source is a visible encoded element mounted on the vehicle.

4. The apparatus of claim 1 further comprising circuitry coupled to the logic circuitry for controlling access to charging by regulating the flow of power from the power source whereby charging of the vehicle is controlled.

5. The apparatus of claim 1 further comprising circuitry coupled to the logic circuitry for controlling access to the power receptacle whereby charging of the vehicle is controlled.

6. The apparatus of claim 1 wherein the connection means is remote from the logic circuitry.

7. The apparatus of claim 6 wherein the connection means is disposed within a parking space, said parking space having a surface, and wherein the connection means comprises a cable and intrinsic connector extendible from the parking space surface to engage the vehicle.

8. The apparatus of claim 6 wherein the connection means is disposed within said vehicle and the power receptacle is disposed on a parking space surface.

9. The apparatus of claim 8 wherein the connection means comprises an automatically extendible connector for engagement with a corresponding connector on a vehicle.

10. The apparatus of claim 1 further comprising a display coupled to the logic circuitry.

11. The apparatus of claim 1, wherein the data source is a machine readable bar code element.

12. A method of charging a vehicle comprising the steps of:
    providing a machine readable coded element associated with a vehicle;
    connecting the vehicle to the charging station having an optical reader; and
    displaying the coded element to the charging station optical reader so as to initiate flow of power from a power supply to charge the vehicle.

13. The method of claim 12 wherein the step of displaying the coded element further comprises displaying machine readable data on the vehicle such that the optical reader reads the data.

14. The method of claim 12 wherein the step of displaying the coded element further comprising displaying machine readable data on a card displayed before the optical reader such that the electronic reader reads the data on the card.

15. The method of claim 14 wherein the step of displaying the coded element further comprises swiping a machine readable card into a slot disposed within the charging station.

16. The method of claim 14 wherein the step of displaying the coded element further comprises displaying a machine readable card before an optical device within the reader.

17. A method of charging a vehicle comprising the steps of:
    reading machine readable data from a data source associated with a vehicle;
    communicating the data to a central processing location;
    processing the machine readable data to receive an approval signal or a disapproval signal; and
    in response to receiving an approval signal of the data, initiating a flow of power to the vehicle to charge the vehicle.

18. The method of claim 17 further comprising:
    in response to a disapproval signal, displaying information on a display of the charging station with respect to the disapproval of the data.

19. The method of claim 17 wherein the processing step further comprises comparing the data to account information corresponding to the data input.

20. The method of claim 17 further comprising displaying charging options to a user on a display of the charging station.

21. The method of claim 17 wherein the reading data step further comprises receiving data from a data source applied to the vehicle.

22. The method of claim 17 wherein the reading step further comprises receiving data from a card inserted into a card reader.

23. The method of claim 17 further comprising;

providing a charging station having a controlled access power receptacle, the power receptacle coupled to a connection to a power source for charging a vehicle; and instructing the charging station to open the power receptacle so as to receive a connector allowing an electrical power connection between the power source and the vehicle.

24. An apparatus capable of connecting a vehicle to a power source for charging, the apparatus comprising:

a housing;

a controlled access power receptacle coupled to the housing, the power receptacle being electrically coupled to the power source;

connection means coupled to the power receptacle for removeably coupling a vehicle to the power source;

logic circuitry contained within the housing coupled to said connection means for selectively controlling access by a user to the power receptacle; and, an optical reader coupled to the logic circuitry for reading data associated with a vehicle from a remote data source, said remote data source being in optical communication with the scanner unit communicating said data to the logic circuitry for controlling charging of said vehicle based on said data.

* * * * *